Patented Oct. 25, 1949

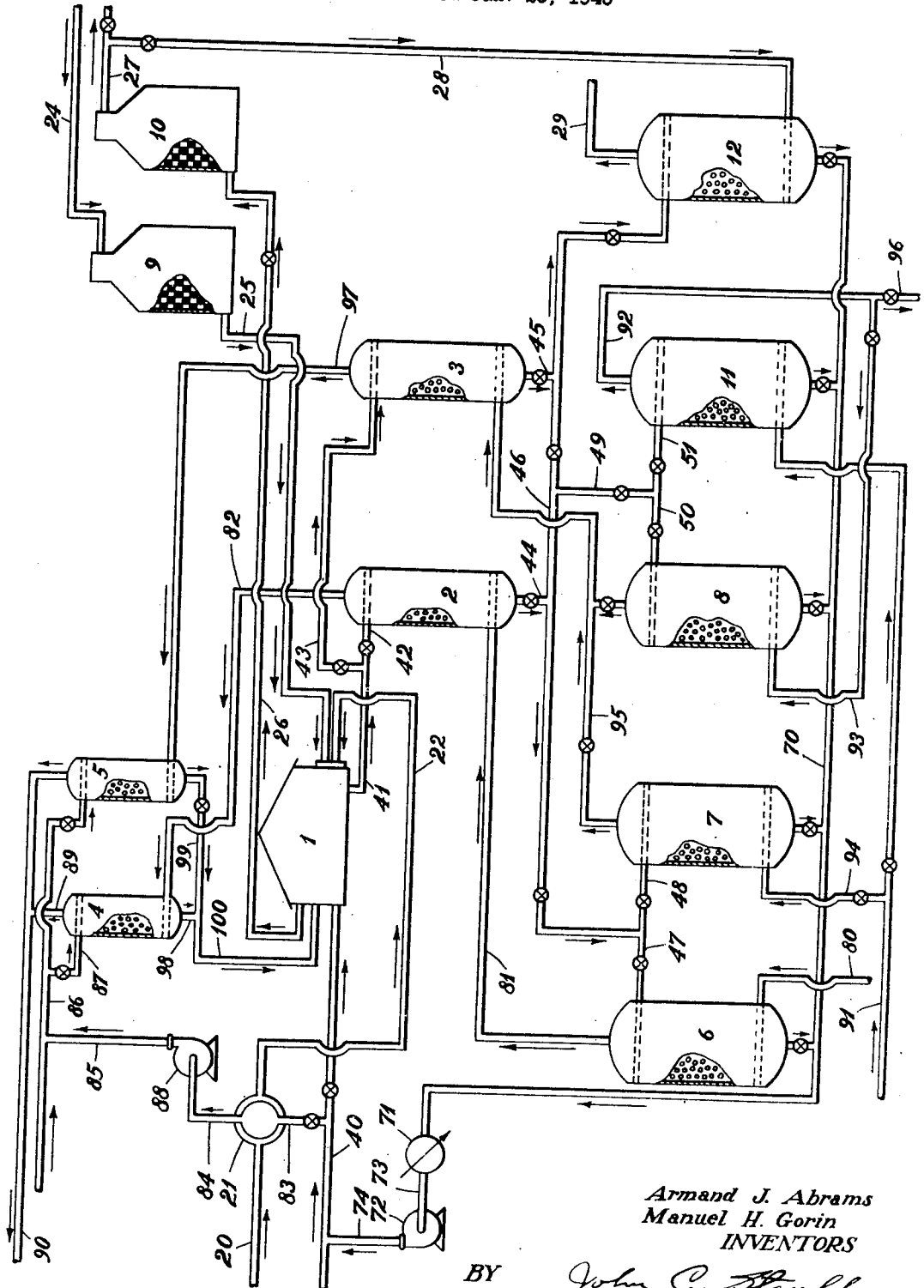

2,485,875

UNITED STATES PATENT OFFICE 2,485,875

PRODUCTION OF SYNTHESIS GAS

Manuel H. Gorin and Armand J. Abrams, Dallas, Tex., assignors, by mesne assignments, to Socony-Vacuum Oil Company, Incorporated, New York, N. Y., a corporation of New York Application January 25, 1945, Serial No. 574,613

12 Claims. (Cl. 48—196)

This invention relates to a method for making synthesis gas for the production of liquid hydrocarbons, methanol and the like from methane or a methane containing gas such as natural gas. More particularly, this invention has to do with a process for the production of carbon monoxide and hydrogen from methane, carbon dioxide and steam wherein the heat necessary for the endothermic reaction is furnished by a molten metal contacted directly with the reactants in one or more reaction zones.

Numerous processes have been proposed for the production of carbon monoxide and hydrogen in suitable proportions for the synthesis of hydrocarbons. These processes generally involve the interaction of hydrocarbons such as methane with steam and/or carbon dioxide or with air to give mixtures of hydrogen and carbon monoxide in volume ratios of 1 to 1 up to 3 to 1, hydrogen to carbon monoxide. The chief technical difficulties confronting operation to produce these reactants in quantity relate to the problems of supplying large amounts of heat to the reacting gases at a high temperature level and of recovering the desired product free from gaseous contaminants, particularly where air is used to oxidize the methane. The solution of this problem has been attempted in some instances by employing externally fired reaction chambers in conjunction with regenerative heat exchangers of special design. However, the problem of designing metallic reaction tubes which will withstand temperatures of 1000° C. or higher and the necessity for using prohibitive lengths of such tubes to obtain capacities consistent with present day requirements of large quantity production make such a method of heat transfer impractical. Other methods of operating on the thermal conversion cycle involve passing the mixture of reactants through a conduit filled with refractory material previously heated to about 1000° C. by an air-gas blast. An objection to this type of operation is the difficulty of maintaining close temperature control at optimum temperature levels in the reaction zone.

In the present invention methane or natural gas is reacted with carbon dioxide and steam to give two volumes of hydrogen for each volume of carbon monoxide according to the overall reaction $$3CH_4 + 2H_2O + CO_2 \rightarrow 8H_2 + 4CO$$

thus producing a synthesis gas of suitable ratio of hydrogen to carbon monoxide to yield a relatively saturated hydrocarbon product in the Fischer type condensation. The ratio is also suitable for the production of methanol from hydrogen and carbon monoxide. Our process should be considered as involving three individual reactions which may be carried out separately or together. These reactions are (1) $\qquad 3CH_4 \rightarrow 3C + 6H_2$ (2) $\qquad 2H_2O + 2C \rightarrow 2CO + 2H_2$ (3) $\qquad CO_2 + C \rightarrow 2CO$ In order to obtain substantially complete decomposition of methane by reaction 1, temperatures in excess of 1500° F. are required if active catalysts such as nickel or cobalt are used and temperatures in excess of 2000° F. are required for complete decomposition of methane in the absence of catalysts. Temperature requirements for reactions 2 and 3 above are in the same approximate range. The rates of these reactions are determined to a marked degree by the nature of the carbon used. Thus carbon deposited in a porous solid such as lime by reaction 1 is much more reactive than coke. For this reason we prefer to carry out our process over a porous solid such as lime.

Reactions 1, 2 and 3 are highly endothermic and we furnish the heat necessary for maintaining the high temperatures and endothermic heat by circulating a molten metal such as lead, tin or other suitable relatively nonvolatile metal having nonwetting properties over porous packing in reaction zones, preferably towers, under nonflooding conditions in direct contact with the reactants. This method of supplying heat to the reactants has the advantage of making possible the maintenance of better temperature control than other methods well known to the art. This method of heat transfer in making synthesis gas is taught in the copending application of Armand J. Abrams, Manuel H. Gorin and Charles Ovid Baker, Serial No. 574,612, filed January 25, 1945, now Patent No. 2,449,359.

Our process may be carried out in one, two or three stages. In the one stage process a mixture of methane, steam and carbon dioxide preferably in the approximate ratio of 3:2:1 respectively, is passed upward through the packed reactor countercurrent to the molten metal and the synthesis gas comprising predominantly hydrogen and carbon monoxide is obtained as the gaseous effluent in the approximate ratio of 2:1. We may vary the ratio of these components in the effluent by varying the relative amount of steam and carbon dioxide in the feed. Thus, to increase the hydrogen content of the product we increase the amount of steam in the feed. By reacting steam only with the methane an approximate ratio of hydrogen to carbon monoxide of 3:1 may be obtained. If steam is excluded and only carbon dioxide is reacted with the methane, an approximate ratio of 1:1 is theoretically possible. However, in practice either the methane will not be completely decomposed or carbon will accumulate in the packing or both of these conditions may arise. As indicated above the use of porous refractory packing permits the deposition of the carbon in the interstices of the porous packing and this deposited carbon tends to maintain reactions 2 and 3 above at optimum rates. The major part of the accumulated carbon may be removed periodically by burning in an atmosphere of air or flue gas diluted air.

In the two stage process, reaction 1 is carried out in a first stage to produce hydrogen and carbon which is retained in the packing. For this process lime is a particularly effective packing material since it retains up to about three moles of carbon per mole of lime and when methane is "cracked" over lime substantially all of the carbon is retained in the packing. This is taught and claimed in the copending application of Armand J. Abrams and Louis B. Cook, Serial No. 419,238, filed November 15, 1941, now U. S. Patent 2,380,008. In the second stage of the two stage process a mixture of steam and carbon dioxide in any desired ratio is passed over the carbon bearing packing produced in the first stage, molten metal such as molten lead being used to supply the necessary heat. These gases react with the carbon in the packing to produce carbon monoxide and hydrogen and the final synthesis gas is obtained by blending the hydrogen from the first stage with the carbon monoxide and hydrogen from the second stage. The two stage process is illustrated in the drawing and described in more detail hereinbelow.

The three stage process differs from the two stage process only in that steam and carbon dioxide are passed separately over the carbon bearing packing, the order being immaterial and the ratio in which these reactants are used being determined by the relative amounts of hydrogen and carbon monoxide required for blending with the hydrogen produced in the first stage to give the final synthesis gas desired. The gas stream from the first stage will comprise relatively pure hydrogen containing less than ten percent of undecomposed methane, a second gas stream will comprise relatively pure carbon monoxide and the third stream will contain carbon monoxide and hydrogen in approximately equal amounts.

Obviously the two and three stage embodiments of our invention have the advantage of greater flexibility in the production of hydrogen and carbon monoxide to produce a synthesis gas of the desired balance relative to the proportions of these components. On the other hand the one stage process has the advantages of lower investment in reactors and lower costs of operation from the standpoint of amount of molten metal circulated.

Referring now to the drawing, furnace 1 is designed for heating of a relatively shallow continuous flowing body of molten metal such as melted lead by impinging directly thereon the flame and combustion products of a hydrocarbon gas such as methane, natural gas or refinery fuel gas with air, the flow of melted lead being counter to flame propagation and counter to the flow of combustion products. Relatively cold melted lead is introduced to the furnace near the exit point for the flue gas which gives up heat to the stream of lead. The lead reaches its maximum temperature, i. e., within the range of 2000° F. and 2400° F., preferably about 2200° F. near the point of flame impingement and is withdrawn from the bottom of the molten stream. In order to prevent oxidation of the metal we may superimpose on the molten metal a relatively thin layer of a low vapor pressure material such as calcium metaphosphate which is liquid at furnace operating temperatures. This material has a melting point of about 1790° F. and when floated on the slowly moving stream of metal in furnace 1 it offers only slight resistance to transfer of heat to the metal if used in a film of from about one-eighth to two inches in thickness. The molten lead is withdrawn from the bottom of the slowly moving stream and hence the protective layer remains practically stationary, preventing oxidation and minimizing vaporization of the molten metal. This method of protecting a molten metallic heat transfer medium against oxidation and vaporization is taught and claimed in the copending application of Armand J. Abrams, Serial No. 574,611 filed January 25, 1945.

Reactors 2 and 3 are packed with porous refractory material such as lime, crushed brick or other ceramic ware of suitable porosity. These are contact zones alternately used for contacting hot metal under nonflooding conditions with methane or natural gas to produce hydrogen and free carbon which deposits in the packing material and then to contact hot metal with steam and carbon dioxide and the deposited carbon to form carbon monoxide and hydrogen in the second stage of the process. As stated hereinabove lump lime is preferred as the packing material since methane can be "cracked" over it and the carbon produced is substantially completely retained by the lime in amounts up to about 3 mols per mol of lime, the carbon being in an active form which allows the carbon-carbon dioxide-steam reaction to proceed readily.

Towers 4 and 5 are lead recovery towers and are packed with refractory material such as ceramic ware. Hot hydrogen and hydrogen-carbon monoxide streams from metal contact reactors 2 and 3 carry an appreciable amount of metal vapors, especially if lead is used as the metal heat transfer agent. These metal vapors are recovered in large part by scrubbing the vapor with the relatively cool liquid metal. Towers 6, 7, and 8, are heat exchange towers for cooling the molten metal from reaction zones 2 and 3 to a temperature suitable for pumping back to furnace 1 and for preheating methane, steam and a mixture of steam and carbon dioxide passing to reactors 2 and 3 as reactant feed to the process. These towers are packed with inert ceramic ware and as the molten metal flows down over the packing it is cooled by direct heat exchange with methane or natural gas fed to reactor 2, with steam and with the steam-carbon dioxide mixture fed to reactor 3. Towers 9 and 10 are heat exchangers of the regenerative type, the ceramic checkerwork packing of which is alternately heated by flue gas effluent from furnace 1 and cooled by passing air therethrough to the burners of furnace 1.

Towers 11 and 12, which represent a multiplicity of alkaline earth carbonate packed recovery towers for desorbing carbon dioxide and adsorbing carbon dioxide from the flue gas, are polyfunctional in that they also serve to cool hot metal flowing by gravity from reactors 2 and 3 to temperatures such that the metal can be pumped. These towers are preferably packed with limestone, that is, calcium carbonate, or dolomite. Limestone upon being heated to temperatures above about 1500° F. decomposes to furnish carbon dioxide at approximately one atmosphere pressure. The refractory calcium oxide residue is an excellent absorbent for carbon dioxide from flue gas at temperatures below about 1400° F. and increases in absorption efficiency as the temperature is lowered. As stated hereinabove, molten metal leaving reactors 2 and 3 at temperatures of 2000° F. or higher should be cooled to a temperature as low as 1400° F. or 1500° F. in order to be readily pumpable for recycle to furnace 1. At least a part of this cooling is accomplished in towers 6, 7, and 8, which are auxiliary heat exchange zones provided to insure sufficient cooling of the metal before recycle to the heating step and to preheat feed gases to the process. By passing a part of the molten metal successively through one or more carbonate packed towers, such as 11 and 12, to desorb carbon dioxide from the carbonate, additional cooling of the metal is accomplished. The carbon dioxide is used in the second stage of the process in reaction zone 3. Low temperature steam may also be injected into the carbonate packing to aid in the desorption of the carbon dioxide and also to aid in lowering the temperature of the molten metal. The desorbed carbonate, i. e., generated oxide, may be further cooled and then used to absorb carbon dioxide from the previously cooled flue gas effluent of furnace 1.

Methane or natural gas in line 20 passes to heat exchange system 21 and thence through line 22 to the burners of furnace 1. If desired, heat exchange system 21 may include one or more stages, not shown in the drawing, wherein hot flue gas is utilized as a source of preheat for fuel passing to furnace 1. Preheated air is mixed with the fuel gas at the burners, the cold air being introduced to the system through line 24 leading to regenerative heater 9 whence the preheated air passes via line 25 to the burners of furnace 1. Hot flue gas passes from furnace 1 through line 26 to regenerative heater 10 to produce a first stage cooling of the gas and to store heat in the checker ceramic packing for subsequent heating of air as described above. From heater 10 the partially cooled flue gas may be passed from the process via line 27. However, we prefer to pass at least a part of the cooled flue gas from line 27 to a heat exchange system (not shown) for further cooling and thence through line 28 to carbon dioxide absorption tower 12 in which tower the calcium carbonate packing has been decomposed to the oxide and in which the oxide has been cooled to a temperature well below 1400° F. in preceding cycles. Flue gas, depleted with respect to carbon dioxide content, passes from tower 12 through line 29.

In the molten metal heat transfer cycle of our process, melted lead is passed via line 40 to furnace 1 where it is heated to a temperature of about 2200° F. The hot metal passes by gravity via line 41 to lines 42 and 43 which lead to the refractory packing in reactors 2 and 3, respectively. As the hot liquid passes downward over the surface of the lime packing in reactor 2 it gives up a part of its sensible heat to the packing and to the countercurrent stream of methane introduced near the bottom of packing in reactor 2 as described hereinbelow. The methane is decomposed to hydrogen and carbon which is deposited in the packing. Following the methane "cracking" cycle the carbon impregnated packing in reactor 2 is subjected to the carbon-steam-carbon dioxide conversion cycle described below.

As the hot liquid metal flows over the carbon impregnated packing in reactor 3 the temperature of the packing is raised to about 2200° F. and the carbon reacts with the countercurrent stream of steam and carbon dioxide to form a mixture of hydrogen and carbon monoxide, the packing being "regenerated" by the loss of carbon to these products and thereby conditioned for the alternate methane conversion cycle. Reactors 2 and 3 may be operated at temperatures within the range of from about 2000° F. to about 2400° F. The liquid metal flows by gravity from reaction zones 2 and 3 at a temperature within the range of from about 1975° F. to about 2100° F. through lines 44 and 45 to manifold line 46 for distribution by means of lines 47, 48, 49, 50 and 51 to cooling towers 6, 7 and 8 and calcium carbonate packed tower 11. The molten metal is cooled in these towers to temperatures below about 1600° F. preferably below 1500° F. and passes through bottom drawoff lines to manifold line 70 which leads to cooler 71 wherein the molten metal may be further cooled to condition the same for pumping. Cooler 71 may be in the form of a waste heat boiler for the production of steam or it may be a heat exchanger of the indirect type for heating any of the fluid streams of the process. The molten lead is picked up by pump 72 in line 73 and recycled through line 74 to metal feed line 40 for reheating in furnace 1.

Referring now to the methane decomposition cycle, methane in line 80 is passed to packed tower 6 where it is preheated by the descending molten metal as described above. If the methane contains appreciable amounts of hydrogen sulfide it should be subjected to a purification step prior to this preheating step in order to produce a hydrogen stream substantially free of hydrogen sulfide. The methane passes overhead via line 81 to reactor 2 where it is decomposed to hydrogen and carbon. The space velocity of the methane should be adjusted so that the overhead gaseous product from reactor 2 consists of more than 90 volume percent hydrogen, the remaining gas being undecomposed methane and a small amount of lead vapor. The gaseous product leaves reactor 2 at a temperature somewhat above 2000° F. and passes through line 82 leading to tower 4 for recovery of a major part of the lead vapors therefrom. Liquid lead may be withdrawn from line 40 through lines 83, 84, 85, 86 and 87 and heat exchanger 21 by means of pump 88 and introduced near the top of the packing in tower 4 to serve as a scrubbing medium to remove lead vapors from the gaseous effluent of reactor 2. The temperature of the liquid lead at the top of tower 4 should be above the melting point of lead, i. e., above about 625° F. and if desired, additional lead cooling means (not shown in the drawing) may be provided in line 84 or line 85 in order to maintain the lead somewhat above this relatively low temperature as it enters tower 4. This temperature should be maintained as low as possible in order to minimize the amount of lead carryover with the gaseous product. As the liquid metal flows over the packing in tower 4 it contacts the hydrogen product and scrubs therefrom the major part of the lead vapor and the gaseous product, cooled to a temperature of from about 700° F. to about 750° F., passes overhead through line 89 to synthesis gas blending line 90. If desired the product may be further cooled to solidify any residual lead which may be recovered by passing the cold gas to a cyclone separator or other separation means well known to the art for recovering the last traces of lead.

In the carbon dioxide desorption step which is carried out in carbonate packed tower 11, the hot metal from line 51 flows downward over the packing and converts the calcium carbonate to calcium oxide. The desorption may be promoted by the aid of steam introduced through line 91 and the mixture of steam and carbon dioxide is passed overhead through line 92 and thence by line 93 to tower 8 where the temperature of the gaseous mixture is raised by contact with hot molten metal introduced to tower 8 via line 50. An additional and separate stream of steam may be preheated for introduction to reaction zone 3 by introduction of low temperature steam to heat exchanger tower 7 described above, the steam being admitted to tower 7 from line 94 which leads from steam line 91. The preheated steam from tower 7 and preheated mixture of steam and carbon dioxide from tower 8 may be combined in line 95 and passed to reaction zone 3 as a mixture comprising approximately a ratio of two parts of steam to one part of carbon dioxide. If desired, the steam-carbon dioxide preheating step may be omitted and the mixture of gases in line 92 may be sent directly to reactor 3. As another alternate we may omit the separate steam preheating step in tower 7 and send all of the steam to tower 11 or 12 to aid in the desorption of carbon dioxide or we may preheat at least a part of the steam in tower 7 and then pass the preheated stream to tower 11 or 12 to aid in the desorption step.

The average temperature of the packing in tower 11 following removal of the carbon dioxide will be above the temperature at which efficient adsorption of carbon dioxide from flue gas can be accomplished. Hence the passage of relatively cold non-preheated steam through tower 11 may be continued until the calcium oxide packing is reduced to a temperature of about 1100° F. This additional steam may be sent via lines 92 and 93 through tower 8 and thence through line 95 to reactor 3 or it may be passed through line 96 to be used as a source of heat in any other part of the process.

In reactor 3 the mixture of steam and carbon dioxide is contacted with molten metal introduced at a temperature within the range of 2000° F. and 2400° F., preferably about 2200° F. from line 43. In the presence of the active carbon in the lime packing the mixture is converted to a mixture of hydrogen and carbon monoxide in approximately equal proportions which passes overhead via line 97 to tower 5 for recovery of lead vapors in the effluent product stream. Tower 5 is operated in a manner similar to the operation of tower 4, the effluent gas from reactor 3 being scrubbed by relatively cold melted lead introduced to tower 5 from line 86. Molten lead leaves towers 4 and 5 at a temperature above about 1800° F. via lines 98 and 99 and flows by gravity through line 100 to furnace 1. The hydrogen-carbon monoxide effluent from tower 5 passes overhead to synthesis gas blending line 90. As in the case of tower 4 effluent, additional lead recovery means may be employed to remove the last traces of lead from tower 5 effluent either before or after blending with hydrogen product from tower 4.

The extent of conversion in reactors 2 and 3 will be determined by the space velocities in these reactors as well as by the temperatures employed. Space velocities within the range of from about 0.2 to 3.0, preferably from about 0.5 to 1.5 volumes of methane or natural gas per volume of packed reaction space per minute, may be used in reactor 2, that is, the methane decomposition cycle and space velocities of carbon dioxide plus steam within this same range may be used in the steam-carbon dioxide-carbon conversion cycle. The preferred range in this latter cycle is from about 0.4 to about 1.0 volume of carbon dioxide plus steam per volume of packed reaction space per minute. The above space velocities are expressed as volumes of gas measured at standard conditions of temperature and pressure. The operation of reactors 2 and 3 is usually at atmospheric or slightly higher pressures up to fifteen pounds gauge pressure.

Although we have described our invention as a two stage process we do not wish to be limited to the separate production of hydrogen and carbon monoxide. As stated hereinabove, the methane, carbon dioxide and steam may be reacted simultaneously in the same reaction zone to produce hydrogen and carbon monoxide in suitable ratio for use as synthesis gas or three separate reaction zones may be used in our process to obtain greater flexibility of operation and more complete conversion. Other variations in the process such as utilizing a different source and method of supplying pure carbon dioxide to the process are within the scope of our invention.

As indicated hereinabove, our process offers certain advantages over previous methods of producing hydrogen and carbon monoxide from methane for use as synthesis gas. One of the chief advantages is the efficient method of direct heat transfer to the reacting gases whereby large volumes of these gases can be converted at high temperatures which can be controlled within narrow ranges.

In describing our invention we have, for reasons of simplicity, omitted certain auxiliary equipment such as pumps, compressors, blowers, waste heat boilers and supplementary equipment for storing and purifying feed material and product of the process. Reactors, absorbers and heat exchange equipment, direct and indirect, may be used in multiple and in series or parallel to better integrate the several stages of the process and to conserve the large amount of heat necessary for this type of hydrocarbon conversion.

Having thus described the nature of our invention and the means of practicing the same, but without intending to limit our invention to such specific means save as set forth in the appended claims, we claim:

1. A process for the manufacture of a synthesis gas comprising hydrogen and carbon monoxide from natural gas, steam and carbon dioxide which comprises the steps of (1) contacting natural gas, steam and carbon dioxide obtained in the manner hereinafter described countercurrently with a hot liquefied metal of group IV of the periodic table selected from the class consisting of tin and lead under nonflooding conditions in a reaction zone packed with a porous refractory solid at temperatures sufficiently high to react said natural gas, steam and carbon dioxide to form hydrogen and carbon monoxide, (2) separating the hydrogen and carbon monoxide in the gaseous effluent of the reaction zone of step 1 from metal vapor in said gaseous effluent by scrubbing in a separate zone said effluent with said liquefied metal, (3) circulating a part of the hot liquid metal from step 1 to a zone containing calcium carbonate to cool said metal, to condition the same for pumping to a metal preheating step and to decompose the calcium carbonate in said zone to calcium oxide and carbon dioxide, (4) circulating the remainder of the liquid metal from step 1 to a plurality of refractory packed heat exchange zones and countercurrently flowing said liquid metal therein with separate streams of natural gas and steam to preheat the same prior to introduction as feed to step 1, and (5) passing the preheated streams of natural gas and steam from step 4 and the carbon dioxide from step 3 to the reaction zone of step 1 of the process.

2. The process of claim 1 wherein the liquefied metal is liquefied lead.

3. The process of claim 1 wherein the liquefied metal is liquefied tin.

4. A process for the manufacture of a synthesis gas comprising hydrogen and carbon monoxide from natural gas, steam and carbon dioxide which comprises the steps of (1) contacting natural gas, steam and carbon dioxide obtained in the manner hereinafter described countercurrently with a hot liquefied metal of group IV of the periodic table selected from the class consisting of tin and lead under nonflooding conditions in a reaction zone packed with a porous refractory solid at temperatures sufficiently high to react said natural gas, steam and carbon dioxide to form hydrogen and carbon monoxide, (2) separating the hydrogen and carbon monoxide in the gaseous effluent of the reaction zone of step 1 from metal vapor in said gaseous effluent by scrubbing in a separate zone said effluent with said liquefied metal, (3) circulating a part of the hot liquid metal from step 1 to a zone containing calcium carbonate to cool said metal to condition the same for pumping to a metal preheating step and to decompose the calcium carbonate in said zone to calcium oxide and carbon dioxide while simultaneously introducing steam to said zone to aid in the desorption of said carbon dioxide and to preheat said steam, (4) circulating the remainder of the liquid metal from step 1 to a plurality of refractory packed heat exchange zones and countercurrently flowing said liquid metal therein with separate streams of natural gas and steam to preheat the same prior to introduction as feed to step 1, and (5) passing the natural gas, steam and carbon dioxide from steps 3 and 4 to the reaction zone of step 1 of the process.

5. A process for the manufacture of a synthesis gas comprising hydrogen and carbon monoxide from natural gas, steam and carbon dioxide which comprises the steps of (1) contacting natural gas, steam and carbon dioxide obtained in the manner hereinafter described countercurrently with a hot liquefied metal of group IV of the periodic table selected from the class consisting of tin and lead under nonflooding conditions in a reaction zone packed with a porous refractory solid at temperatures sufficiently high to react said natural gas, steam and carbon dioxide to form hydrogen and carbon monoxide, (2) separating the hydrogen and carbon monoxide in the gaseous effluent of the reaction zone of step 1 from metal vapor in said gaseous effluent by scrubbing in a separate zone said effluent with said liquefied metal, (3) circulating a part of the hot liquid metal from step 1 to a zone containing calcium carbonate to cool said metal to condition the same for pumping to a metal preheating step and to decompose the calcium carbonate in said zone to calcium oxide and carbon dioxide while simultaneously introducing steam to said zone to aid in the desorption of said carbon dioxide and to preheat said steam, (4) circulating the remainder of the liquid metal from step 1 to a plurality of refractory packed heat exchange zones and countercurrently flowing said liquid metal therein with separate streams of natural gas, steam and the mixture of steam and carbon dioxide from step 3 to preheat the same prior to introduction as feed to step 1, and (5) passing the preheated streams of natural gas, steam and mixture of steam and carbon dioxide from step 4 to the reaction zone of step 1 of the process.

6. The process as described in claim 5 wherein the liquefied metal is liquid lead.

7. The process as described in claim 5 wherein reaction zone of step 1 is maintained at a temperature within the range of from about 2000° F. to 2400° F. by means of the liquefied metal.

8. The process as described in claim 5 wherein the liquefied metal is liquid tin.

9. A process for the manufacture of a synthesis gas comprising hydrogen and carbon monoxide from natural gas, steam and carbon dioxide which comprises the steps of (1) contacting natural gas, steam and carbon dioxide obtained in the manner hereinafter described countercurrently with a hot liquefied metal of group IV of the periodic table selected from the class consisting of tin and lead under nonflooding conditions in a reaction zone packed with a porous refractory solid at temperatures sufficiently high to react said natural gas, steam and carbon dioxide to form hydrogen and carbon monoxide, (2) separating the hydrogen and carbon monoxide in the gaseous effluent of the reaction zone of step 1 from metal vapors in said gaseous effluent by scrubbing in a separate zone said effluent with said liquefied metal, (3) circulating a part of the hot liquid metal from step 1 to a zone containing calcium carbonate to cool said metal to condition the same for pumping to a metal preheating step and to decompose the calcium carbonate in said zone to calcium oxide and carbon dioxide while simultaneously introducing steam to said zone to aid in the desorption of said carbon dioxide and to preheat said steam, (4) circulating the remainder of the liquid metal from step 1 to at least one refractory packed heat exchange zone and countercurrently flowing said liquid metal therein with a stream of natural gas to preheat the same prior to introduction as feed to step 1, and (5) passing the natural gas, steam and carbon dioxide from steps 3 and 4 to the reaction zone of step 1 of the process.

10. A process for the manufacture of a synthesis gas comprising hydrogen and carbon monoxide from a methane containing gas, steam and carbon dioxide which comprises the steps of (1) countercurrently contacting said methane containing gas at methane decomposition temperatures under nonflooding conditions with a stream of liquefied metal selected from the class consisting of tin and lead in a porous refractory packed reaction zone whereby said methane is decomposed to hydrogen and carbon is deposited in said porous refractory, (2) countercurrently contacting a mixture of steam and carbon dioxide at reaction temperatures under nonflooding conditions with a stream of the same liquefied metal as used in step 1 in a second porous refractory packed reaction zone in the presence of refractory bearing carbon deposited in step 1 to form a mixture of hydrogen and carbon monoxide, (3) separating the hydrogen in the gaseous effluent of the reaction zone of step 1 and the mixture of hydrogen and carbon monoxide in the gaseous effluent of the reaction zone of step 2 from metal vapor in said gaseous effluents by scrubbing said effluents with said liquefied metal in a separate zone, (4) circulating a part of the combined streams of hot liquid metal from steps 1 and 2 to a zone containing at least one alkaline earth carbonate to decompose said carbonate in said zone to the corresponding alkaline earth oxide and carbon dioxide, (5) circulating at least a part of the remainder of the combined streams of hot liquid metal from steps 1 and 2 to at least one of a plurality of refractory packed heat exchange zones and countercurrently flowing said liquid metal therein with the methane containing gas of step 1 to preheat the same prior to introduction as feed to step 1, (6) passing the preheated methane containing gas stream of step 4 to the reaction zone of step 1, and (7) passing the carbon dioxide from step 4 and steam as feed gas to the reaction zone of step 2 of the process.

11. The process of claim 10 wherein the steam of step 7 is preheated in at least one of the plurality of refractory packed heat exchange zones by counterflow with a part of the remainder of the combined streams of hot liquid metal from steps 1 and 2 before introduction of said steam as feed to the reaction zone of step 2.

12. The process of claim 10 wherein the steam of step 7 is passed to the alkaline earth carbonate decomposition zone of step 4 whereby the desorption of the carbon dioxide decomposition product of step 4 is promoted and said steam is preheated, and wherein a mixture of said preheated steam and desorbed carbon dioxide is passed from said decomposition zone as a gaseous mixture to the reaction zone of step 2 of the process.

MANUEL H. GORIN.
ARMAND J. ABRAMS.

REFERENCES CITED

The following references are of record in the file of this patent:

UNITED STATES PATENTS

| Number | Name | Date |
|---|---|---|
| 1,951,774 | Russell et al. | Mar. 20, 1934 |
| 1,959,151 | Beekley | May 15, 1934 |
| 1,992,909 | Davis | Feb. 26, 1935 |
| 2,284,603 | Belchetz | May 26, 1942 |
| 2,354,353 | Abrams | July 25, 1944 |